United States Patent [19]

Tripp

[11] 4,136,446
[45] Jan. 30, 1979

[54] ROTARY CUTTING ASSEMBLY WITH MECHANICAL LINE FEED

[75] Inventor: Dwight E. Tripp, Longview, Tex.

[73] Assignee: Weed Eater, Inc., Houston, Tex.

[21] Appl. No.: 761,942

[22] Filed: Jan. 24, 1977

[51] Int. Cl.² .............................................. A01G 3/06
[52] U.S. Cl. ........................................ 30/276; 56/12.7
[58] Field of Search .................... 30/276, 347; 56/12.7, 56/295; 226/127; 51/335

[56] References Cited

U.S. PATENT DOCUMENTS

| | | | |
|---|---|---|---|
| 2,125,781 | 8/1938 | Harris | 226/127 |
| 2,771,721 | 11/1956 | Reiman | 51/335 |
| 3,664,102 | 5/1972 | Reber | 56/295 |
| 3,928,911 | 12/1975 | Pittinger | 30/276 |

Primary Examiner—Jimmy C. Peters

[57] ABSTRACT

A vegetation cutter and method employing a revolving flexible non-metallic line as a cutting member is provided with means for mechanically feeding out additional line to replace lengths broken during operation of the cutter. A rotatable spool is provided for storing extra line in a coiled configuration, with the unwound portion being extended from the rotatable head of the cutter to an exit aperture at its periphery. A control mechanism provides for moving angularly the spool an incremental distance within the rotating head to feed out an increment of line only when desired. Means secure the spool in the head to prevent inadvertent unreeling of cutting line.

22 Claims, 14 Drawing Figures

ROTARY CUTTING ASSEMBLY WITH MECHANICAL LINE FEED

BACKGROUND OF THE INVENTION

This invention relates to an improved cutting assembly in the form of a rotary head for a rotary lawn edger, trimmer or the like, and more particularly relates to improved methods and apparatus for cutting vegetation with a flexible non-metallic cord member.

It is well known to cut grass, weeds and other vegetation with a moving flail-like member, and it is now well known to employ a flexible non-metallic cord member for the purpose of cutting vegetation located in places which are inaccessible to apparatus employing a rigid steel blade. In particular, the trimmer which is marketed in various forms under the trademark WEED EATER, and which is described in U.S. Pat. Nos. 3,708,967; 3,826,068; and 3,859,776, is now widely known and used for this purpose.

This invention relates to an improved cutting assembly in the form of a rotary head for a rotary edger, trimmer or the like. The preferred embodiment is in the form of a portable edging and trimming tool wherein the cutting element is safe in most uses and avoids the hazardous conditions created by prior art devices.

The prior art is prolix with attempts at solutions to provide a safe, efficient and simply constructed rotary head for rotary edgers, trimmers and the like. One attempt comprises a rotating metal bar or the like which is rotated at sufficient speeds to effect cutting of grass, weeds or the like. However, such bars create hazardous conditions in that when they strike certain objects they act upon those objects in a fashion to create and project dangerous missiles which may strike the operator or individuals in the area of work.

Various attempts have been made to overcome the aforesaid hazardous conditions created with rigid-type metal cutting blades of the prior art. Most of these attempts to overcome the problem involve the utilization of some type of flexible flail which will have sufficient resiliency so as not to propel objects which are struck at high velocities. Most of these resilient type cutting elements of the prior art suffer a disadvantage in that they are not safe and mere resiliency is not sufficient to insure that the dangerous conditions will not be created when rotation is effected at desired cutting speeds. Further, the prior art cutting elements are generally not provided with means for easy replaceability in the event of wearing out and are usually expensive to replace.

The result has been that most of the prior lawn and edging apparatus have been unsatisfactory because of the dangerous conditions created by the rotating head. As a consequence, most lawn edging and trimming around trees and the like, which would otherwise be damaged by the metal blades, must be done manually, which is both laborious and time consuming.

There is depicted and described in the following West German Petty or Gebrauchsmuster Pat. Nos. 6,919,841; 6,919,842; 6,919,843; 6,919,844; 6,938,265; 7,043,648 and No. 7,238,972, one or more embodiments of a lawn trimming device having a disc-like head member arranged to be rotated by an electric motor, and containing a spool which is housed therein in coaxial relationship to the shaft of the motor. A length of flexible non-metallic line is coiled about the spool, whereby its free traveling end extends generally peripherally from the spool and head, and whereby such free traveling end will be swung arcuately about upon actuation of the motor to cut adjacent vegetation in the manner of a flail.

The German Device will cut effectively only light-weight vegetation and suffers severely from a high-breakage rate of the plastic line.

These disadvantages of the prior art, and especially the aforementioned German device, are overcome with the present invention, and commercially acceptable embodiments of a vegetation cutter and the like are herein provided, which are not only fully capable of cutting vegetation under most operating conditions, but which are also fully capable of other tasks completely beyond the capabilities of the German device, such as cleaning dead leaves, trash and other such debris from along fences, walls and the trunks or stems of trees and bushes. More particularly, however, the embodiments of the present invention are capable of operation with a much higher efficiency and much lower breakage rate of their cutting string than has heretofore been possible with prior art devices.

Contrary to presupposition, a plastic string can usually cut vegetation almost indefinitely without breaking, provided the string engages only vegetation of the type sought to be cut. On the other hand, it will also be apparent that if a plastic string does impact against a resistive object, such as a concrete wall or chain link fence or the like, the string or line will be more likely to break than will a rigid steel blade. Since this type of cutter is expressly intended to be used to cut vegetation adjacent such resistive objects, it will not be surprising that the string or line will often experience breakage, and that the string or line must therefore be replaced from time-to-time.

As shown in the aforementioned United States patents, it has been found necessary and desirable to provide trimmers with a spool having a substantial length of cutting line coiled therein, and to employ only a short unwound portion of the line as the cutting member. Thus, if a portion of the extended cutting portion of the line becomes damaged or broken, the cutting member may be replaced by manually unwinding a new portion of line from the spool, and extending this unwound portion to form the new cutting member.

This manner of manually providing replacement cutting line has been found to be subject to certain problems, however. As may be seen in the aforementioned U.S. patents, it is desirable to protect the coiled portion of the line from moisture and debris by enclosing it in a circular head member, and to extend the unwound portion through a peripheral aperture in this head member to form the cutting member. Therefore, if the string breaks at a point at or within the head member, it is often necessary to remove and disassemble the head member in order to gain access to the head member.

Another problem with providing for manually unwinding cutting line from its spool arises from the fact that the spool is recessed snugly within the circular head member to prevent the line from escaping from the spool and head member during revolvement of the spool and head member. Thus, when it is desired to withdraw or unwind more cutting string, it is necessary to draw the string about the edge of the flange of the spool, while the string is wedged between the rim of the flange and the surface of the housing, and this tends to damage the cutting line or string. Either that, or else it is necessary to bend the flange away from the head to provide more clearance from the cutting line, which tends to damage the spool. In either case, it will be apparent that this, in turn tends to greatly reduce the overall convenience of this type of cutting apparatus, and to create an operating problem which is not present in more conventional cutters.

It has been proposed to overcome this and other related disadvantages by providing such equipment with means for mechanically extending or feeding out lengths of cutting line from the head member. There is, for example, depicted and described in U.S. Pat. No. 3,928,911, issued to Pittinger, a mechanical line feeding mechanism for use with an apparatus for cutting vegetation and the like with a flexible non-metallic string. There is also depicted and described in U.S. Pat. No. 3,664,102, issued to Reber, a flexible non-metallic cord type trimmer which utilizes a mechanical line feeding mechanism.

Although the Pittinger device does provide mechanical and incremental line feed when actuated, the device is subject to certain disadvantages to limit its practical value. Thus, the device requires a pair of pivoted toothed jaws which cam the line member therebetween. The camming action of the teeth on the line member injures the line member and produces weaknesses and flaws therein. Hence, the teeth of the camming jaws cause internal flaws and indentations in the line member which are highly undesirable since such flaws and indentations weaken the line and contribute to line breakage as the weakened and idented section is withdrawn and used as the flail portion of the cutting assembly. In contrast, the device of the present invention includes no direct contact of mechanical elements with the line member itself and thus, avoids any chance of damaging any of the stored portion thereof.

The Reber device includes a toothed control wheel that positively derives a toothed line reel with which it is intermeshed. While this system provides mechanical and incremental line feeding it is relatively complex in construction thus rendering manufacturing difficult. In addition, the system of intermeshing elements adds excessive weight to the cutting unit thus rendering it difficult to handle and causing serious problems in the maintenance of rotational balance of the cutting assembly. In contrast thereto, the device of the present invention is simple in construction and involves lightweight components.

These disadvantages of the prior art are overcome with the present invention, and commercially acceptable embodiments of a vegetation cutter and the like are herein provided which are not only fully capable of cutting vegetation under most operating conditions, but which are also fully capable of automatically, incrementally, and mechanically feeding cutting line from the cutting head during operation of the device without incurring damage to the cutting line or any other portion of the apparatus.

SUMMARY OF THE INVENTION

This invention is an improved cutting method and apparatus functioning as a rotary lawn edger, trimmer or the like. A head member is rotatable about an axis generally perpendicular to the cutting plane. A flexible non-metallic cutting line on the head member extends into the cutting plane. Two or more cutting lines may be used effectively for present purposes under proper circumstances. A supply of the cutting line is carried on a spool within the head member with a free end portion of the cutting line extending radially from the revolving head member. A certain incremental length of cutting line will be automatically fed from the spool and out of the head member during operation of the device in response to a control means activated by the user.

In a preferred embodiment, the control means includes an actuating mechanism operable from a point at the upper (user) end of the apparatus' handle. The control means will only feed out a preselected length of cutting line from the head member when desired by the user. At all other times, securing means prevent discharge of cutting line from the head member. Thus, accidental or unintended unwinding of cutting line when the line becomes entangled with saplings or from other causes, is effectively prevented.

The cutting line is characterized by having an effective length to diameter ratio, and of a material composition such as to render the line flexible and yielding to the extent that it is substantially incapable of causing damage or injury when impacting against persons, animals, trees, etc. Preferably, the effective working length to diameter ratio is at least 50:1, and is preferably provided with a diameter which is substantially greater than its axial thickness. The head member is concentrically and axially mounted on the end of a rotary drive shaft.

In one ideal arrangement, a circular head member is provided which contains a strand of cutting line wound thereabout so as to present one free traveling end extending from the periphery of the head assembly. It is a feature that a preselected replacement length of cutting line will be automatically fed out of the head member during rotation of the device whenever the user desires. For example, the user may desire to extend the active line length when it becomes undesirably short due to wear or breakage resulting from impact of the line against fences, trees, walls, etc., as well as unusual vegetation.

It is a feature of the present invention to provide a simple and lightweight line feed mechanism that may be actuated during operation of the cutting device to feed or pay out additional and incremental lengths of fresh cutting line. In a particularly suitable embodiment, a "floating" control ring is provided on the head member of the assembly. A braking assembly is operatively associated with the control ring whereby actuation of the brake mechanism allows the spool member carried within the head to move with respect to the head member and thereby feed out a fresh incremental length of cutting line.

It is another feature of the present invention to provide a mechanical feed system wherein a spool member containing storage line is rotatable with and within a rotatable head member, and wherein braking of the rotation of the head member simultaneously frees the spool for incremental movement within the head member thereby paying out an additional section of line of predetermined length. The braking of the rotation of the head member is instantaneous and concurrently therewith the spool is free to move within the head member from one locked position to a second locked position.

In its broadest concept, any type of motor may be employed for purposes of the present invention to rotate the aforementioned automatic feed head assembly. However, a gasoline-driven engine is more powerful and far more suitable for a cutting device intended to be employed in commercial or industrial size plots or areas. However, an electric motor is cheaper and of lighter weight than a gasoline-driven engine and is therefore far more suitable for a cutting device intended to be employed in residential-size plots or areas, and the like, wherein lesser cutting capabilities are normally required. Accordingly, it is a particular feature of one embodiment of this invention to employ an electric motor having characteristics especially suitable for such purposes.

As hereinbefore discussed, use of the present device over a long period of time will result in line wear, and therefore line will be automatically paid out from the storage spool within the cutting head. However, it will readily be apparent that the storage capabilities of the storage spool is finite and that the storage spool from time to time will have to be wound and replenished with new line, or else the entire spool will have to be replaced. Consequently, it is a feature of the present invention to provide a rapid, efficient and simple means for removing the spool from the head whereby a new cutting line may be wound onto the storage spool. Alternatively, means may be provided for employment of a fresh insertable spool. In addition, easy access to the head facilitates line untangling and other similar operations when necessary.

Because electric motors operate at maximum efficiency only when properly ventilated, it is a feature to provide means for forcing air to circulate about the electric motor herein. It is also a feature to provide air inlet holes sufficiently far away from the motor and the grass cutting operation that grass cuttings or other debris is not sucked into the air inlet holes.

These and other features and advantages of the present invention will become apparent from the following detailed description, wherein reference is made to the figures in the accompanying drawings.

DETAILED DESCRIPTION

Figures 1, 2:
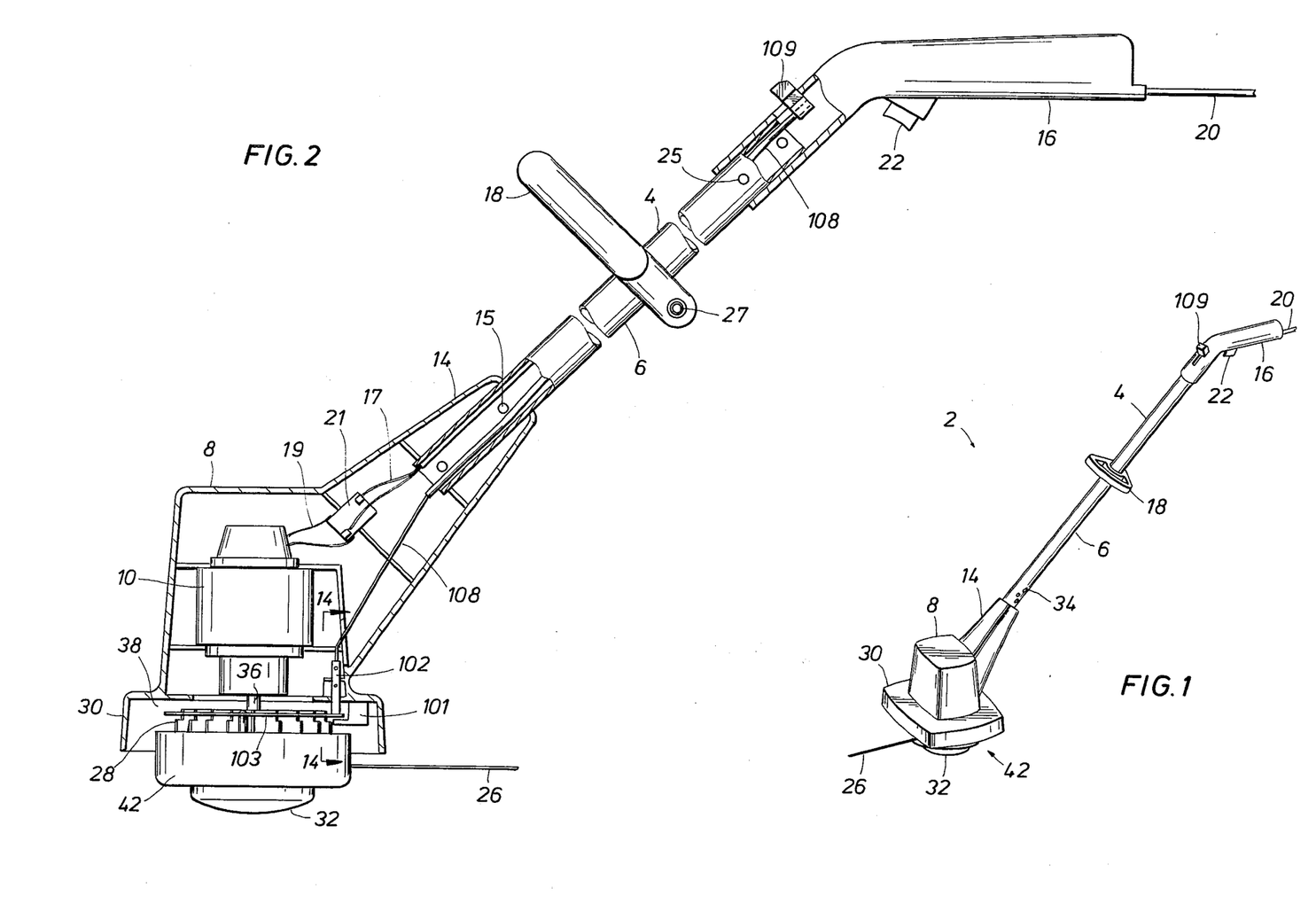
FIG. 1 is a pictorial view showing the entire cutting apparatus.
FIG. 2 is a pictorial side view, partly in longitudinal-section, of the apparatus depicted in FIG. 1, wherein the mechanical features and configuration of the apparatus are set forth in greater detail.

Referring now to FIGS. 1-2, a portable type edging device generally designated by the numeral 2 is shown, and which is of the type preferred for lighter tasks in residential-size plots or areas, and the like, where electrical power is immediately and conveniently available to the operator. Accordingly, the apparatus may be composed of two tubular members 4 and 6 having a casing 8 containing electric motor 10 mounted at one end, which motor drives a string cutting head 42. The handle 6 is removably attached to and supports casing 8 by screws 15 insertable in shank 14. Such a device 2 is portable and is hand-held and manipulated by an operator by means of trigger handle 16 and intermediate handle 18. Handle 16 is attached to tubular member 4 by screws 25, whereas handle 18 is attached to tubular member 4 by an easily adjustable wing-nut assembly 27. Power may be applied to motor 10 through a conventional electrical-type insulated cord or conductor 20, having an appropriate plug at one end (not shown), and having its other end passed through the tubular members 4 and 6 for connection with the motor 10 by means of connectors 17 and 19 at contacts of either a half-wave or a full-wave rectifier 21. An appropriate ON-OFF switch or trigger 22 may conveniently be located adjacent the handle 16 at the upper end of the tubular member 4, for interconnection with the conductor 20 and motor 10. The cutting plane of the cutting string 26 may be easily arranged in either a horizontal or vertical position or tilted to any angle, to cut along sidewalks, around trees and rocks, and along fences and the like, where it is either unsafe or difficult to cut with conventional apparatus, merely by manipulating handles 16 and 18.

Referring more particularly to FIG. 2, there may be seen a larger and more detailed pictorial representation of the apparatus depicted more generally in FIG. 1. More particularly, the apparatus or vegetation cutter 2 depicted therein may be seen to include a hollow casing 8 or the like, with a single string circular cutting head 42 which is rotated by the shaft 36 of an electrical motor 10 of suitable design mounted within casing 8.

The cutting head 42 may be further seen to include cutting strand 26 extending laterally from the cutting head 42 through either aperture 60 or 62 (FIG. 3) of suitable configuration, a distance which is a function of the present invention as will hereinafter be explained. As further indicated, the casing may have a circular flange portion or shield 30 for preventing the cutting head 42 from being brought into injurious contact with a wall or tree during its rotation by motor 10.

When the motor 10 is inactivated and the rotary head 42 is in a static condition, the cutting strand line 26 will tend to flexibly dangle from one of the equally spaced-apart windows 60 and 62 (FIG. 3) to the extent permitted by inherent characteristics of line 26. When the cutting head 42 is rotated at normal operating velocities, however, the line 26 will tend to stand out rigidly (but also flexibly and yieldably) from the periphery of the cutting head 42 as indicated in FIGS. 1 and 2.

As will hereinafter be explained in greater detail, a spool containing surplus line is rotatably and removably insertable into cutting head 42, and held in place by glide ball 32. In addition to securing the spool in place, glide ball 32 allows the device to be operated if desired without having to be continually and solely supported by an operator. The device 2 may be rested and propelled forward on the glide ball 32 when in operation if this type of cutting is found to be desirable. Generally the unit is supported by the operator at handles 16 and 18.

An electric motor operates in an optimum manner when the air around it is allowed to be circulated or otherwise cooled. The hollow casing 8 effectively allows air to freely circulate around motor 10, therefore providing forced air circulation. The plurality of upstanding fins 28 located on the top of cutting head 42 and extending radially outward from the axis thereof provide forced circulation of air about motor 10 when motor 10 rotates head 42. Rapid rotation of head 42, and hence of fins 28, causes said fins to create a low pressure zone within casing 8, whereby air is drawn from the atmosphere through openings 34 in lower tubular member 6 and passed into and through shank 14 and casing 8 and around the motor 10 and expelled through the space 38 between flange 30 and cutting head 42. This circulation of air sufficiently cools motor 10 to provide maximum efficiency and minimal ambient heat rise. Moreover, the openings 34, located in tubular member 6, are sufficiently removed from the cutting area that cut grass or other debris flung up by line 26 is not likely to enter openings 34 along with the air.

The cutting line 26 may be composed of a variety of suitable materials as, for example, an elastoplastic extrusion which has been stretched to align the molecules axially. An example of such line is a nylon monofilament of the type commonly used for fishing line. However, other lines may be used, as for example, yarn, cord, rope, twine, braided line, or monofilament, whether described as elastoplastic, elastomeric, natural fiber, or synthetic fiber, and whether compounded of several materials. Nevertheless, there are certain parameters within which the lines must fall in order to be effective.

The cutting line 26 should preferably have sufficient fatigue, abrasion, impact resistance, and tensile strength to allow a reasonable service life, and should have as small a diameter as is consistent with the foregoing parameters so that the sharpest cutting edge is provided for effecting cutting of the grass, weeds, or the like. The line 26 should further preferably be as lightweight as possible, so that when the line shears or breaks during use and pieces are thrown from the cutting head 42, such pieces will travel only a limited distance and will strike persons or other objects in the immediate vicinity with little or no appreciable impact.

Cutting may be achieved with line 26 formed of a metal material, and such lines may have a greater tensile strength than if formed of nylon or the like. Metallic lines are more subject to breakage because of fatigue, however, and the relatively greater mass of a piece of metal cutting line will cause it to travel like a projectile for a considerable distance if breakage occurs. In addition to this dangerous feature, the fact that the greater mass of a metallic line requires a larger, heavier motor 10 of greater power makes the use of metallic line 26 undesirable for present purposes. On the other hand, the relatively small mass of a line formed, for example, of an extruded nylon monofilament, creates complex design problems which must be effectively solved to achieve effective cutting of lush vegetation, and this will become even more apparent when it is recognized that only the last one full inch or so of the line 26 actually impacts against the vegetation sought to be cut.

In view of the above, and in further regard to the theory of the invention, it should be understood that in a rotating system as above described, the tip impact has been found to be a function of the mass of the tip of the flexible line member 26 and the tip velocity thereof. This tip impact parameter has been found useful in determining the effectiveness of the cut produced when using the disclosed type cutting device. Thus, it has been found that the higher the tip impact, the better and more effective the cut. Conversely, as the tip impact decreases, due to variation of one of tip mass and tip velocity, the quality and effectiveness of the cut likewise is lowered.

In order to understand the relationship of tip impact being a function of tip mass and tip velocity, each of the latter two must be considered separately as will be set forth hereinafter.

Thus, it has been determined that tip mass is a function of the mean cross-sectional diameter of the line member 26 and the mass of the material of construction of said line member. Since it is contemplated as above set forth to construct the line member of a material such as nylon, it will be apparent that this light-weight type of material will possess a very small mass. Thus, in its relationship to tip mass, the mass of the material of the line member will be negligible. Therefore, it will be readily seen that the primary factor determining tip mass is the mean cross-sectional diameter of the line member. Hence, when speaking in terms of tip mass, it should be clear that this term is considered to include primarily the mean cross-sectional diameter of the line member and with little or no emphasis upon the mass of the material of which the line member is made.

As hereinbefore explained, tip impact is a function of tip mass and tip velocity, tip mass being essentially the mean cross-sectional diameter of the line member.

Referring now to FIGS. 3–9, it may be seen that the lower end of the drive shaft 36 from motor 10 is arranged for threading engagement with a drive adapter or attachment member 36A. Drive adapter 36A extends downwardly through head 42 and is arranged at its lower extremity for threading arrangement with glide ball 32. Drive adapter 36A inserts tightly into head 42 and retains its relationship with head 42 by means of its hexagonal head 40 which is insertable into head 42. Rotation of drive adapter 36A by drive shaft 36 causes head 42 to also rotate, thereby extending the strings to perform a cutting function.

Figure 3:
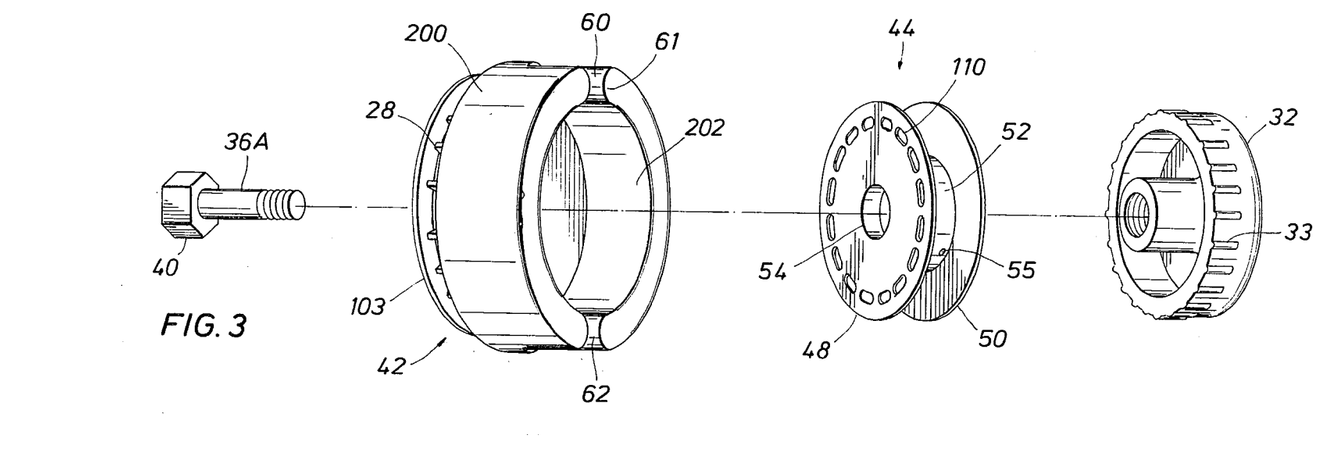
FIG. 3 is an exploded assembly drawing of the embodiment of the head and spool assembly.
Figure 4:
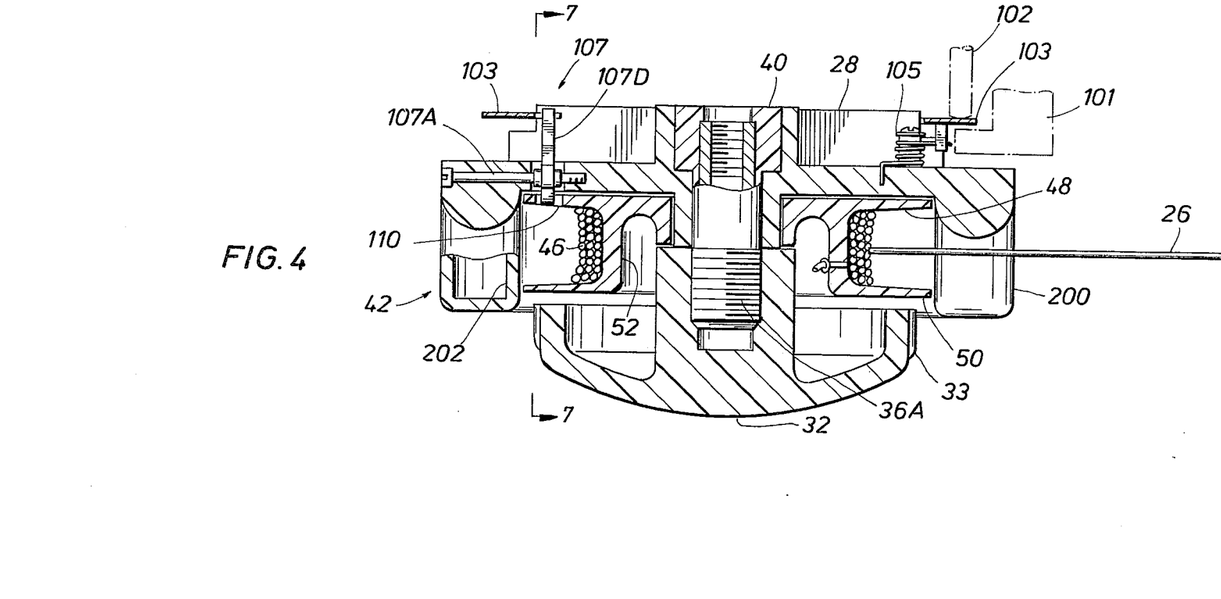
FIG. 4 is a longitudinal-sectional view of the head assembly depicted in FIG. 3 in a static or nonrotating position showing the cutting string mounted therein.
Figure 10:
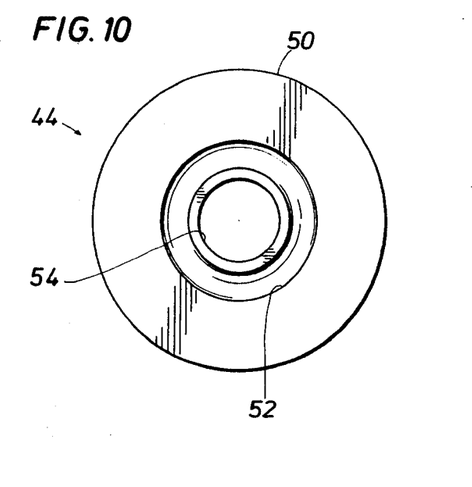
FIG. 10 is a top plan view of the spool depicted in FIG. 3.
Figure 11:
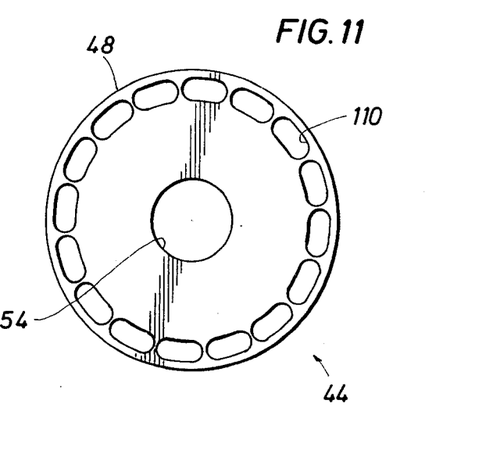
FIG. 11 is a bottom plan view of the spool depicted in FIG. 3.
Figure 12:
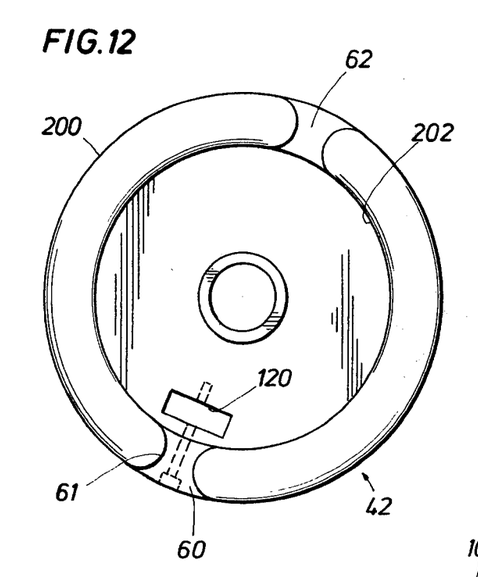
FIG. 12 is a top plan view of the head depicted in FIG. 3.
Figure 13:
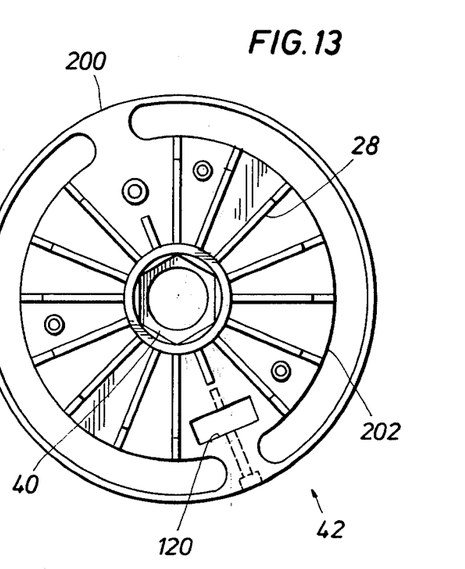
FIG. 13 is a bottom plan view of the head depicted in FIG. 3.
Figure 14:
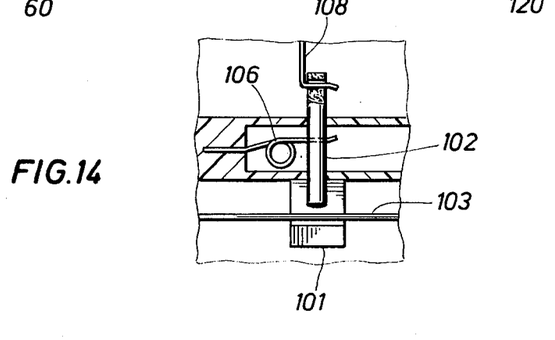
FIG. 14 is a detailed side view of a portion of the apparatus of FIG. 2 and taken along line 14—14 thereof.

Glide ball 32, in addition to engaging drive adapter 36A and securing said drive adapter 36A in relationship with head 42 so as to provide axial rotation thereof, also releasably secures spool 44 within head 42 as shown in FIG. 4. Spool 44 contains spare cutting line 46 therein, which is arranged for paying out at predetermined times and at predetermined lengths to vary the effective working length of the cutting line 26. Removal of glide ball 32 by unthreading it from drive adapter 36A allows removal of spool 44 so that a fresh full spool may be inserted into head 42, or spool 44 may be rewound with replacement line, or the like. The external circumference of glide ball 32 may be provided with equally spaced-apart vertical lineal protrusions 33 to insure a better grip for easier removal. Spool 44 as seen in FIGS. 3, 10 and 11 is composed of a bottom wall 48 and a top wall 50 spaced a predetermined equidistance by hub 52. Interior of hub 52 is an aperture 54 in wall 48 through which drive adapter 36A passes when threaded into glide ball 32.

It may be clearly seen in FIGS. 2-4 that in one embodiment a single line 26 extends from the body of the cutting head 42, and through one of the two window apertures 60 and 62. In the embodiment therein depicted, one end of the line 26 is inserted through aperture 55 in the spool hub 52, and then knotted together to prevent disengagement therefrom. The line 26 is then preferably wound about the pool 44, oppositely of the direction of rotation of spool 44 and head 42, and then extended through one of respective window apertures 60 and 62, as hereinbefore stated.

In an alternate embodiment of the present invention, a pair of cutting lines 26 may be provided but no additional structure is required to provide this dual cutting line feature. For example, and in light of FIGS. 3 and 4, the empty spool 44 is wound as above. However, in the dual cutting line embodiment, the line 26 is first doubled along its length thereby providing two free ends. That portion of the line that is doubled is inserted through aperture 55 and knotted as above. The doubled line is then wound onto the spool until the two free travelling ends are reached. Each free end of the line 26 is then extended through one of the respective window apertures 60 and 62, thus providing a head assembly 42 including a pair of cutting strands 26.

As hereinbefore explained, it is a feature of the present invention to provide against impact of the line against the head member by distributing the shock of such impact along the line. Referring now to FIG. 3, the two window apertures 60 and 62 are each composed of a pair of curvilinear and spaced apart sidewalls 61. In this embodiment of the present invention, the cutting line 26 is composed of a coiled portion 46 (FIG. 4) wound about the spool 44, and a free traveling end portion extending along a tangent thereto outwardly through one of the respective window apertures 60 and 62. Accordingly, the line tends to abut the trailing one of the pair of sidewalls 61 composing the respective one of the two windows 60 and 62, rather than the sidewall 61 which leads the line as it is carried arcuately about by rotation of the cutting head 42. The curvilinear line bearing surface 61 of each of window apertures 60 and 62, is preferably formed by constructing the head member 42 of a pair of spaced apart walls 200 and 202 seen in FIGS. 3 and 4. Thus, wall 200 defines the outer periphery of head member 42 whereas wall 202 defines the inner periphery thereof. As illustrated, the space between walls 200 and 202 is otherwise open.

In a preferred embodiment of the present invention, it has been determined that an effective length-to-diameter ratio for a nylon monofilament line or the like preferably be greater than 50:1. It has further been found that the best cutting line for the purposes of this invention are extruded nylon line, having a diameter of about 0.060 inches to about 0.125 inches. The normal rotating speed will be on the order of about 6,000-7,000 RPM.

It has been determined that for the embodiments disclosed herein, the optimum parameters call for a cutting length (the length extending beyond the periphery of the cutting head) of substantially 5-9 inches. A head diameter of about 5.0 inches is desirable although cutting heads of substantially larger or smaller diameters are contemplated herein.

As hereinbefore explained, it is a feature of the present invention to provide a novel mechanical line feed whereby a preselected incremental length of cutting line will automatically be fed out of head 42 during operation of the device whenever the user desires. Referring now to FIG. 2 for a detailed showing of the mechanical and automatic incremental feed mechanism of the present invention, there will be seen in association with the handle 16, a feed mechanism actuator button 109. Handle 16 is slotted to allow for movement of the button 109 therealong. It should be apparent, that button 109 is operated manually and pressed in a direction along handle 16 and away from the cord end 20 when it is desired to feed additional fresh cutting line. The button 109 includes a solid portion extending downwardly therefrom inside handle 16 to which is threadedly attached one end of a control rod 108. Control rod 108 extends from button 109 downwardly through tubular members 4 and 6. The lower end of control rod 108 is attached to a brake plunger element 102 seen to be in the configuration of a cylinder. Cooperating with plunger 102 is a return spring 106 (shown in FIG. 14) which biases the plunger 102 and control rod 108 upwardly to return button 109 to its original position. Thus, it should be apparent that movement of button 109 toward handle 18 acts to actuate the feed mechanism. The button 109 is then released and returned to a retract position by the action of the spring bias of element 106. As will be described hereinafter in greater detail, it is only required to actuate button 109 momentarily to feed the fresh line. Thus, it is not necessary and is not required to maintain pressure against button 109 to cause the feed mechanism to operate.

Further details of the incremental, sutomatic, and mechanical feed assembly of the present invention as depicted and described herein will be seen to comprise a brake plate or shoe 101 attached to shield or bumper guard 30 in facing relationship to a "floating" control ring 103. The brake plate or shoe 101 is conveniently secured to guard 30 by means of screws in order to fixedly attach it thereto. This arrangement provides that upon actuation of button 109, control rod 108 forces plunger 102 downwardly against control ring 103 which is then pressed and cammed between brake plate 101 and brake plunger 102. The control ring 103 therefore acts in much the manner of a disc of a conventional disc brake. However, this is as far as the parallel can be carried.

Figures 5, 6:
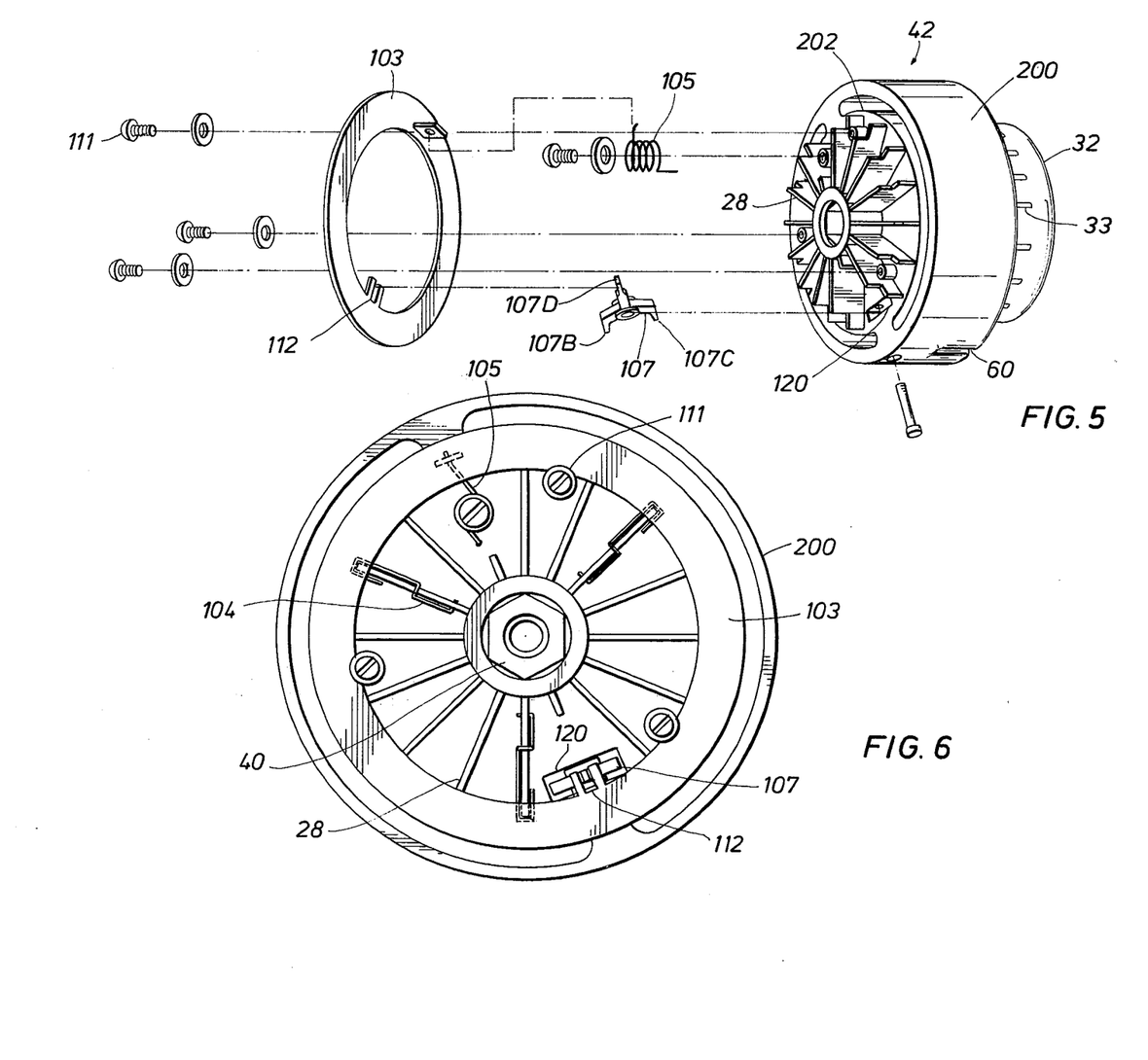
FIG. 5 is another exploded view of the head assembly depicted in FIG. 4.
FIG. 6 is a top view of the head assembly depicted in FIG. 4.

For example, as can be seen readily in FIGS. 4, 5 and 6, the control ring 103 is provided in a "floating" relationship to head member 42. This is accomplished by a first set of two or more axial bias spring elements 104 which allow movement of control ring 103 toward and away from the head member 42 along the axis. Thus, the spring elements 104 provide that the control ring 103 be depressed toward the head member 42 against the bias of springs 104 and allow the control ring 103 to move away from the head member 42 with the bias of the springs 104. Movement of control ring 103 away from the head member 42 is, of course, limited by the presence of screws 111 that determine the upper extent of travel of control ring 103 away from the head member 42. This system of attaching the control ring 103 to the head member 42 provides one phase of its floating axial relationship to the head member 42.

The control ring 103 is further arranged to float angularly with respect to head member 42 by a bias spring 105 attached between the control ring 103 and the head member 42. Control ring 103 can be moved by an external force a small distance, counter rotationally, with respect to head member 42. However, the bias of spring 105 in absence of this force returns the control ring to its original position. Thus, the springs 104 and 105 provide a yielding connected relationship between the head member 42 and the control ring 103 so that the control ring is free to float both axially and angularly with respect to the head member. Axial float enables plunger 102 to move ring 103 towards brake plate 101 when button 109 is actuated for braking action. Angular float enables the ring to actuate the ratchet 107 to feed an incremental length of line from the head member 42 as hereinafter described. This ratchet actuation is provided by a slot 112 carried in control ring 103 as shown in FIG. 5. Angular movement of control ring 103 relative to the head member 42 is transmitted to ratchet 107 by an upstanding arm portion 107D engaged with slot 112 on the control ring 103. The arm 107D responsively moves the ratchet 107 between first and second positions that advance the spool 44 an incremental distance in the head member 42.

As seen in FIGS. 5 and 6, head member 42 includes an opening 120 in which the ratchet 107 is pivoted upon an axle 107A embedded in head member 42. A pair of first and second stop tabs 107B and 107C, respectively, extend from the ratchet element into the confines of the head member 42 and provide an escapement system for the incremental movement of the spool 44 relative to the head member. The spool 44 has a smaller diameter than the inside diameter of the wall 202 of the head member 42 and is free to rotate stepwise and in certain increments with respect to and within the head member 42 as regulated by the stop tabs 107B and 107C.

It should therefore be apparent from FIG. 2, and more particularly with respect to FIG. 4, that movement of button 109 towards handle 18 in order to actuate the feed assembly moves control rod 18 downwardly within tubular elements 4 and 6. This movement of rod 108 in turn presses brake plunger 102 in a direction toward and against control ring 103 which is then forced against brake plate 101. As hereinbefore mentioned, the axial float of control ring 103 on head member 42 by means of the springs 104 provides this control ring with axial movement and causes a camming or braking action. The resultant braking action causes control ring 103 to move angularly relative to head member 42 and ratchet upper arm portion 107D moves from a first to a second position through connection with control ring slot 112. Movement of arm portion 107D causes ratchet 107 to pivot about axle 107A thereby raising one of the stop tabs 107B and 107C and lowering the other of stop tabs 107B and 107C. Return angular movement of control ring 103 is provided by the bias of spring 105 in the absence of the braking action when the button 109 is released. At this time the ratchet 107 pivots to relock the first stop tab into the next control ring slot 112. When the plunger 102 is lifted, the control ring 103 is free again for axial movement away from brake plate 101. The ratchet 107 again locks the spool 44 to the head member 42 and no line can be drawn into the cutting plane.

Figure 7:
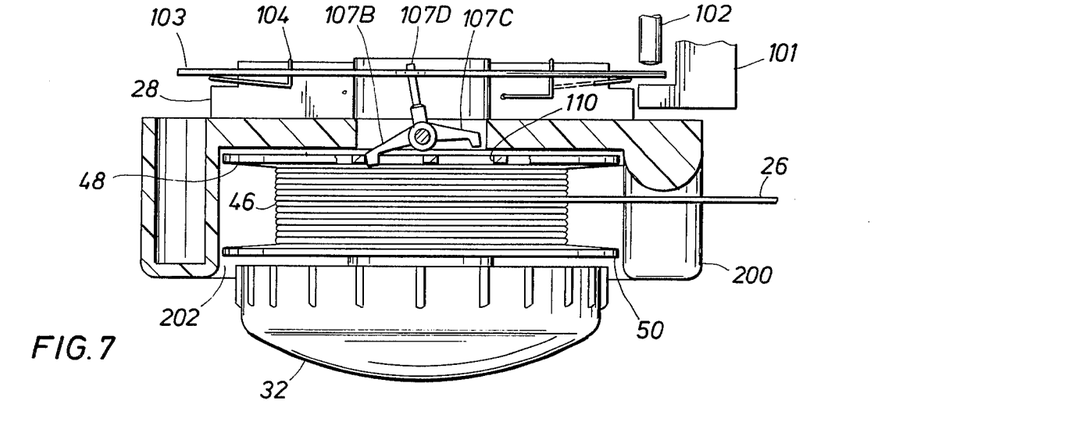
FIG. 7 is a side view of the head depicted in FIG. 4, and taken along line 7—7 thereof.
Figure 8:
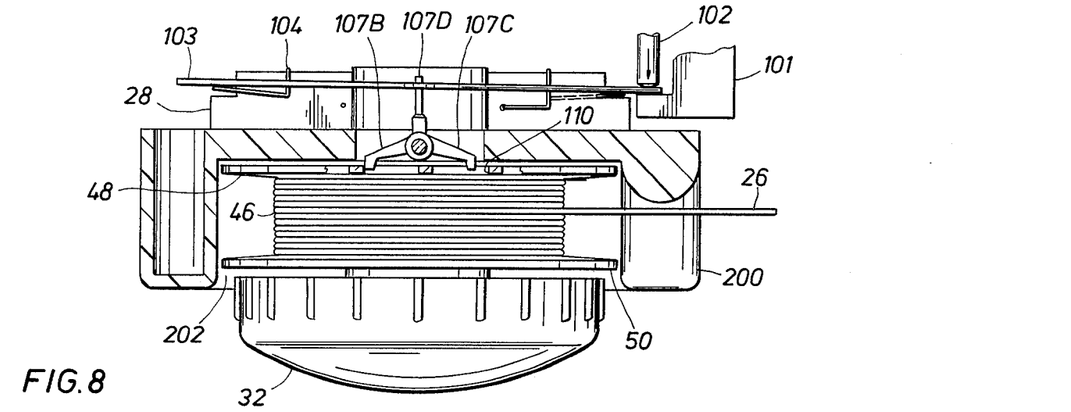
FIG. 8 is a side view of the head depicted in FIG. 7, and showing the ratchet in a second position.
Figure 9:
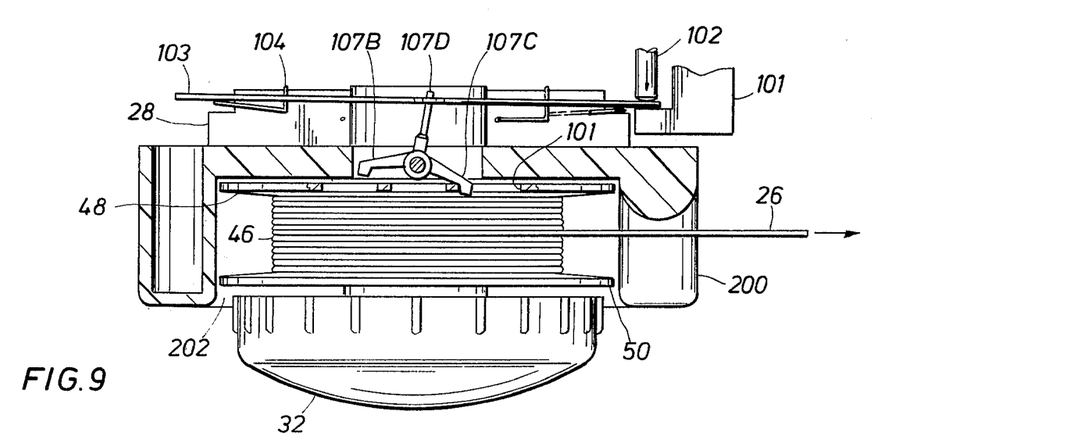
FIG. 9 is a side view of the head of FIG. 7 in a static or nonrotating position, and showing the ratchet in a third position.

The angular movement of the control ring and its actuation of ratchet 107 between first and second positions advances stepwise the spool 44 an incremental distance prescribed by slotted apertures 110 in angular spacings in the spool wall 48. These apertures 110 will cooperate in an escapement function with the stop tabs 107B and 107C of ratchet 107. Thus, when one of stop tabs 107B and 107C is depressed by the action of control ring 103, it will engage one of an adjacent pair of the apertures 110, while the other of the stop tabs 107B and 107C will ride above the adjacent one of the pair of slots 110, as seen in FIGS. 7 through 9.

It should be apparent, therefore, that the depressed one of the stop tabs locks the spool at one of the slots 110. Upon actuation of button 109, however, the raised stop tab lowers and allows the spool 44 to move angularly one additional slot temporarily, while the formerly depressed stop tab raises and frees the spool to move the additional slot. Upon release of the button 109, the raised stop tab moves downwardly again to engage and lock into the spool at the next adjacent and newly positioned slot 110. Now, the other of the stop tabs moves again to its raised and original position. This alternate up and down movement of the stop tabs 107B and 107C induced by the braking action on control ring 103 allows automatic and incremental movement of spool 44 within and with respect to head member 42 and produces the controlled feeding of an additional increment of fresh cutting line.

The spool 44 rotates within the head member 42 by pulling of the line caused by the considerable centrifugal force generated by rotation of the unit head assembly. Since the interior wall 202 of the head member is smooth, and by virtue of the fact that the walls 48 and 50 of spool 44 are of less diameter than the diameter of wall 202 of head member 42, there is little or no resistance to the rotational movement of the spool 44 within the head member 42 while controlled by the alternate stop tab action. There may be only a slightly perceptible slowing of head member 42 in rotation by the instantaneous but light braking action applied to the control ring 103 but the spool member 44 will rotate angularly to the extent determined only by the action of stop tabs 107B and 107C. These tabs are so constructed, arranged and interrelated with the head 42 and ring 103, to allow movement of the spool 44 from only one slot to another adjacent slot of a pair, thereby providing an incremental increase of the length of the flail portion of the line member 26 each time the button 109 is actuated. It should be noted in this regard, that the particular number of the slots 110 that are provided in wall 48 of spool 44 will determine the length of fresh line extended each time button 109 is actuated. For example, if six slots 110 are provided in wall 48 each actuation of button 109 will automatically and incrementally feed an additional fresh length of line 26 equal to one-sixth of the circumferential extent of the coiled portion 46 then wound on the spool 44. Obviously any number of slots may be provided depending upon the particular design parameters of the unit involved and the particular length sought to be extended in each instance. Slots 110 in the range, however, of 12-18 have been found to be most desirable for the full-wave and half-wave embodiments of the present invention as described above.

Although the present invention has been discussed with respect to only a single cutting line, it is nevertheless within the scope of the invention to provide for mechanical feed of a plurality of such lines which, of course, will extend from different locations about the periphery of the head member. This would entail, as described above, the doubling of the line wrapped upon the spool 44 and the insertion of one of each of the free ends into a respective aperture 60 and 62.

Referring now to FIG. 1, the device 2 is depicted in the normal horizontal cutting attitude. In actual practice, much of the grass or weeds to be cut will be close to the ground, and therefore the device 2 will have to be tilted slightly to cuase the cutting string 26 to cut close to the ground. In this regard, the glide ball 32 may be used to allow the unit to "ride" the ground as the cutting operation takes place, and the convex outer lower shape of the glide ball enables an operator to conveniently tilt the unit 2 to any desired angle. It is to be noted, that regardless of which embodiment of the invention is used, handle 18 may be manipulated to result in horizontal or angular deployment of the cutting head.

When the coiled storage portion of line on the spool is finally exhausted, it is simply required to disassemble the head assembly and rewind a fresh supply of line on the spool. In the rewinding operation, the fresh line is wound in the direction opposite the direction of rotation of the head member. In the alternative, and where circumstances dictate, it may be feasible to merely disassemble the spent spool and assemble a fresh pre-wound spool. This would be the case where spare spools are available and where any rewinding of the spent spool would be inconvenient.

It should, therefore, be apparent that the feed mechanism of the device of the present invention simply, efficiently and automatically extends the free end of the cutting flail to a new operational length each time the flail becomes unduly worn and shortened. While disclosed as being useful for automatically feeding fresh line in an edger/trimmer device, it may be employed wherever automatic feeding of line is found to be desirable.

As hereinabove noted, a completely new type of vegetation cutting device has been developed and marketed under the trademark "Weed Eater," which device is depicted generally in U.S. Pat. Nos. 3,708,967; 3,826,068 and 3,859,776, and which employs a flexible non-metallic cord which is revolved to function as a cutting element. This type of device is similar to that depicted herein and has enjoyed spectacular commercial success as an edger/trimmer, since it provides a number of advantages which cannot be found in conventional cutters. For example, these cutters are capable of reaching into areas not accessible to rigid steel blades and the like, and thus, the instant device as the Weed Eater trimmer can remove weeds and other vegetation located in close proximity to walls, fences, trees and even within crevices in such walls and the like, without damage to such walls and trees. Second, and more important for present purposes, the Weed Eater trimmer is substantially completely safe to operate since the revolving cord will cause injury under only the most unusual circumstances.

When a rigid steel blade, however, is revolved in its cutting plane, it yields to the grass only to the extent that it may tend to slow, but it does not become warped or distorted so as to be deflected from its intended cutting plane. If a flexible non-metallic string is revolved to cut vegetation, however, it yields to the grass in various ways. In particular, it not only yields laterally in that it assumes a curvilinear configuration, but it also tends to be deflected upward by the grass it is cutting. Accordingly, if the cord of a Weed Eater is brought into contact with resistant vegetation, the cord tends to move in a cutting "plane" which actually has a warped configuration. This warping effect is an advantage of the present device as the Weed Eater edger/trimmer, since it is this warping which enables its user to manipulate its cord to cut away the most inaccessible vegetation.

An edger/trimmer, and especially the Weed Eater trimmer, and that disclosed herein, is not intended as a leveler, per se, but as hereinbefore stated, is intended to reach vegetation growing in otherwise inaccessible locations. Thus, an edger/trimmer must provide a cutting plane which can be manipulated into a variety of angles with respect to the surface of the earth and, in the case of the instant device as with the Weed Eater edger, must be capable of non-alignment of its cutting element relative to its normal cutting plane.

It will thus be apparent, that this invention provides the art with a cutting device which can quickly, easily, and efficiently cut grass, weeds, and the like; over, under, around, and between rocks, culverts, and the like; and can cut around and between trees, posts, bushes, buildings, and other stationary objects, or the like. Further, this apparatus will be particularly convenient for the operator in that the cutting line is automatically fed from the cutting head when the cutting line becomes worn or breaks.

The apparatus of this invention can also be used successfully in yard trimming and cleaning operations where there is considerable debris, such as bottles, cans, papers, wood, wire and the like, without creating a dangerous condition in that the cutting elements of this device do not create missiles of such trash. Because of the nature of the cutting element of this invention, such objects are not thrown, but rather the cutting string acts in a resilient fashion, so as not to impart sufficient force to such objects to become missiles; or if they are thrown, they are projected at only a very low velocity as compared with cutting devices heretofore in use. Experience has shown that in operating an apparatus of this device with line of the type described, the cutting line may accidentally come in contact with the operator's shoes, articles of clothing, or the like, without serious injury as would be the case with prior art rigid blade devices.

From the foregoing, it will be apparent that there has been provided in apparatus and method a novel vegetation cutter using a rotating head with non-metallic flexible line having a mechanical feed system so that at the user's selection during operation an incremental length of cutting line is fed into the cutting plane but at all other times the cutting line is secured to the head. It will be understood that certain changes and alterations of the present apparatus and method may be made without departing from the spirit of this invention. These changes are contemplated by and are within the scope of the appended claims which define the invention. Additionally, the present description is intended to be taken as an illustration of this invention.

What is claimed is:

1. Apparatus for cutting vegetation and the like, comprising:
  (a) head means rotatable about an axis in a cutting plane and carrying spool means mounted for rotation therein about said axis;
  (b) driving means for rotating said head means in said cutting plane and about said axis;
  (c) a flexible non-metallic line member having a coiled portion carried on said spool means and further having a free end portion extending outwardly of said head means into said cutting plane;
  (d) securing means for securing said spool means against rotational movement relative to said head means;

(e) control means for (1) releasing said spool means for rotational movement within said head means; (2) regulating rotation of said spool means only through a predetermined angular displacement within said head means to extend an additional certain length of said line member outwardly from said head means into said cutting plane during rotation of said head means; and then (3) securing said spool means against rotation within said head means upon each actuation of said control means by a user of said apparatus; and (f) said control means including a floating ring member carried by said head means and braking means adapted to act upon said floating ring.

2. The apparatus described in claim 1, including first means to mount said ring with respect to said head means for movement of said ring generally in the direction of said axis.

3. The apparatus described in claim 2, including second means to mount said ring with respect to said head means for angular movement of said ring with respect to said head means.

4. The apparatus described in claim 3, wherein there is provided a lower brake plate in cooperative relationship with said ring.

5. The apparatus described in claim 4, including an upper brake plunger in cooperative relationship with said ring and said brake plate.

6. The apparatus described in claim 5, including means for moving said brake plunger toward said ring and for camming said ring between said brake plunger and said brake plate.

7. The apparatus described in claim 6, wherein the first and second mounting means each include spring biasing means attached between said head means and said ring.

8. The apparatus described in claim 1, wherein said braking means includes a slotted section and said control means has ratchet with a ratchet arm positioned within said slotted section of the braking means.

9. The apparatus described in claim 8, wherein said ratchet includes a pair of downwardly depending stop tab releasing means.

10. The apparatus described in claim 9, including a plurality of angularly spaced slots in said spool means for cooperation with said pair of stop tab means.

11. The apparatus described in claim 10, wherein at least one of said stop tab means extends into at least one of said angular slots of said spool means.

12. The apparatus described in claim 7, wherein said control means includes a ratchet associated with said head means.

13. The apparatus described in claim 12, wherein said ratchet includes an arm portion pivoted with respect to said head means.

14. The apparatus described in claim 13, wherein said ratchet includes an upwardly extending arm portion.

15. The apparatus described in claim 14, and wherein said braking means includes a slotted section and said ratchet arm is positioned within said slotted section of the braking means.

16. The apparatus described in claim 15, wherein said ratchet axle portion includes a pair of downwardly depending stop tab releasing means.

17. The apparatus described in claim 16, including a plurality of circumferentially spaced slots in said spool for cooperation with said pair of stop tab means.

18. The apparatus described in claim 17, wherein at least one of said stop tab means extends into at least one of said circumferential slots of said spool.

19. The apparatus described in claim 18, and including means associated with said head means for limiting the movement of said ring in the direction of said axis.

20. The apparatus described in claim 19, wherein said spool includes top and bottom circular walls each sized to a diameter less than the interior diameter of a cylindrical cavity in said head means.

21. The apparatus described in claim 20, including a housing supporting and enclosing said driving means, tubular handle means attached at one end to said housing, and means carried within said tubular handle means for actuating said braking means.

22. The apparatus described in claim 21, wherein said means for actuating said braking means includes a movable actuator button associated with the other end of said tubular handle means.

* * * * *